Patented Feb. 19, 1929.

1,702,871

UNITED STATES PATENT OFFICE.

ALPHONS O. JAEGER AND FRANK A. CANON, OF CRAFTON, PENNSYLVANIA, ASSIGNORS TO THE SELDEN COMPANY, OF PITTSBURGH, PENNSYLVANIA, A CORPORATION OF DELAWARE.

PROCESS OF PURIFYING PHTHALIC ANHYDRIDE.

No Drawing. Original application filed February 8, 1927, Serial No. 166,807. Divided and this application filed September 6, 1927. Serial No. 217,878.

This invention relates to methods of purifying phthalic anhydride, and particularly phthalic anhydride prepared by the vapor phase catalytic oxidation of naphthalene.

Depending on the catalyst used and on the conditions of reaction, phthalic anhydride, which is prepared by the catalytic vapor phase oxidation of naphthalene in the presence of oxygen-containing gases, contains various impurities, such as for instance, the primary oxidation product of naphthalene alphanaphthaquinone and condensation and polymerization products of alphanaphthaquinone, such as for example, $\beta\beta$ dinaphthyldiquinone and condensation products of alphanaphthaquinone with phthalic anhydride to form phthaleins and the like, which are of more or less complicated composition and which are in part colored and as a result tend to turn technical phthalic anhydride yellow, gray, brown, red or green.

There are also frequently present other impurities whose chemical constitution is not definitely known, such as tarry products and the like. A further class of impurities are further oxidation products, such as maleic acid and traces of benzoic acid which are frequently noted in technical phthalic anhydride. The relative amounts of these various impurities depend on the conditions of reaction and on the nature of the catalyst used.

Crude phthalic anhydride is usually purified by sublimation and this may be considered as the standard commercial method today. This process, however, does not remove all of the impurities, as some of them are volatile and therefore pass over with the phthalic anhydride and may render it unsuitable for certain purposes.

According to the present invention, the volatile impurities are transformed into relatively non-volatile products or at least products which have a much higher boiling point than phthalic anhydride and are hence separable therefrom by sublimation or distillation. We have found that most of these volatile impurities are of an unsaturated nature and can be transformed into relatively non-volatile products by various physical and chemical means.

According to the present invention, the impurities are transformed into relatively non-volatile products by a selective halogenation with or without pressure and with or without halogen carriers. We have found that chlorine is a particularly suitable halogen and constitutes the preferred reagent, but any other active halogen may be used therefor. The halogenation preferred is carried out by passing chlorine into molten phthalic anhydride with vigorous agitation, if necessary neutralizing any hydrochloric acid formed with manganese dioxide. At the same time the manganese dioxide acts as a chlorine carrier or chlorination catalyst. This method we have found is particularly effective in transforming naphthoquinonoid bodies and maleic acid into non-volatile compounds of high boiling point, which are then easily separated from the phthalic anhydride by sublimation or fractional distillation and permit the production of phthalic anhydride of high purity.

The invention will be illustrated in greater detail by the following specific example:

Example 1.

1,000 kg. of technical phthalic anhydride are placed in a kettle which is surrounded by a metal alloy bath provided with indirect heating of the bath and forced circulation. The phthalic anhydride is heated up to 150–160° C. and after about 3% of manganese dioxide has been stirred in, 2 or 3% of gaseous chlorine is introduced with vigorous agitation at atmospheric pressure or under a vacuum. The introduction should be sufficiently gradual so that no odor of chlorine is noticed and no chlorine bubbles are formed. The phthalic anhydride is then distilled off and constitutes a colorless product of excellent characteristics.

In the claims, the expression "air oxidation phthalic anhydride" is used to cover a product which is produced by the vapor phase oxidation of naphthalene with air or oxygen-containing gases.

This application is a division of our prior application Serial No. 166,807, filed February 8, 1927.

What is claimed as new is:

1. A method of purifying air oxidation phthalic anhydride, which comprises selectively halogenating the impurities and then submitting the phthalic anhydride to vaporization.

2. A method of purifying air oxidation phthalic anhydride, which comprises selectively chlorinating the impurities and then submitting the phthalic anhydride to vaporization.

3. A method of purifying air oxidation phthalic anhydride, which comprises selectively halogenating the impurities in the presence of a halogen carrier favoring the halogenation of unsaturated compounds and submitting the phthalic anhydride to vaporization.

4. A method according to claim 1, in which the halogenation takes place in the presence of an antacid, which is capable of neutralizing any hydrochloric acid formed.

Signed at Pittsburgh, Pennsylvania, this 2nd day of September, 1927.

ALPHONS O. JAEGER.
FRANK A. CANON.